Nov. 11, 1924.  
H. G. W. OTT  
BRACE  
Filed Jan. 11, 1923  
1,515,131
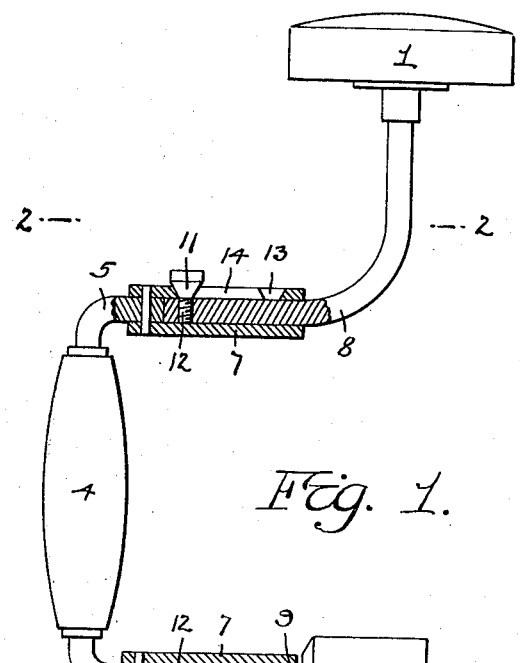
Fig. 1.
Fig. 2.
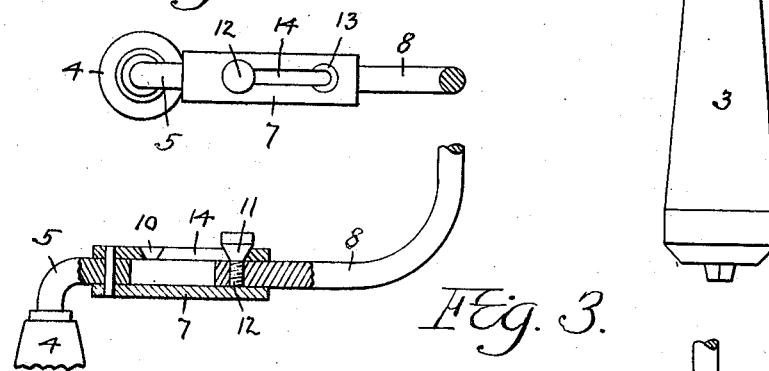
Fig. 3.
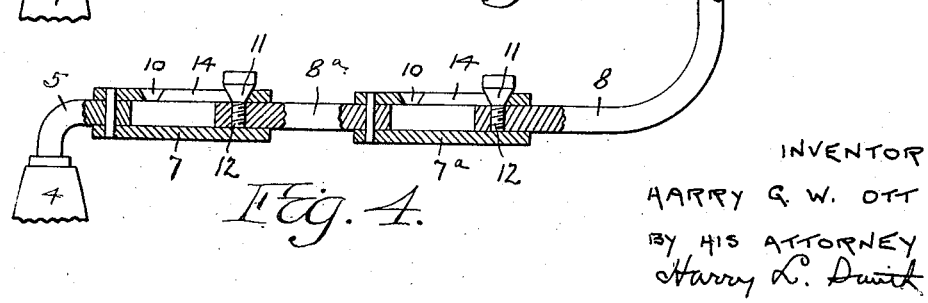
Fig. 4.
INVENTOR  
HARRY G. W. OTT  
BY HIS ATTORNEY Patented Nov. 11, 1924.

1,515,131

UNITED STATES PATENT OFFICE.

HARRY G. W. OTT, OF PHILADELPHIA, PENNSYLVANIA; MARTHA OTT ADMINISTRATRIX, C. T. A., OF THE ESTATE OF THE SAID HARRY G. W. OTT, DECEASED.

BRACE.

Application filed January 11, 1923. Serial No. 612,105.

*To all whom it may concern:*

Be it known that I, HARRY G. W. OTT, a citizen of the United States, residing in Philadelphia, Pennsylvania, have invented certain Improvements in Braces, of which the following is a specification.

My invention relates to braces such as are used by carpenters and other artisans for the boring of holes.

The object of my invention is to construct a brace of the character specified in such a manner that the sweep of the operating handle may quickly and easily be increased or decreased to accord with the degree of leverage which it is desired to exert.

This object I attain in the manner hereinafter set forth, reference being had to the accompanying drawing, in which, Fig. 1 is a view, partly in side elevation and partly in vertical section, of a brace constructed in accordance with my invention.

Fig. 2 is a sectional plan view on the line 2—2, Fig. 1.

Fig. 3 is a view similar to a portion of the Fig. 1, but illustrating certain parts of the construction in a different position of adjustment, and Fig. 4 is a view similar to Fig. 3, but illustrating a modification of my invention.

Referring, in the first instance, to Fig. 1 of the drawing, there is shown a brace having a head 1, a bit-holding chuck 3, and an operating handle 4 which is the usual complement of parts with which tools of this nature are provided. The head 1 and chuck 3 are in axial alignment and the axial line of the operating handle 4 is parallel thereto but laterally removed therefrom.

Briefly stated, my invention resides in the provision of means whereby the distance between these two axial lines may be increased or decreased with a resultant increase or decrease in the sweep of the handle when the brace is in use.

The laterally extending upper and lower stems 5 and 6 with which the handle 4 is provided have each secured thereto a sleeve 7 into which are adapted to be inserted the corresponding stems 8 and 9 which laterally project, respectively, from the head 1 and the chuck 3.

Engaging with a conical aperture 10 in each sleeve 7 is a conical head 11 of a set-screw 12 which engages with and is carried by the laterally projecting stem 8 or 9. This construction serves to connect and maintain in alignment the corresponding stems 5 and 8, and 6 and 9.

Each sleeve 7 is further provided with a similar conical aperture 13 which is connected with the aperture 10 by means of a slot 14. When it is desired to increase the sweep of the handle 4 the set screws 12 are backed off sufficiently to free the conical heads 11 from the apertures 10 and the sleeves are moved, laterally, along the respective stems 8 and 9 until the heads 11 are in line with the apertures 13, when the screws 12 are tightened as shown in Fig. 3. Thus the distance between the parallel axial lines is increased. To decrease the distance the above described operations are, naturally reversed.

It is, of course, obvious that provision may be made for more than two positions of adjustment by a simple increase in the number of apertures with which each sleeve is provided and it is equally obvious that other means of adjustable connection than the aperture and set screw construction may readily be provided. This illustrated construction is purely an example and is not to be regarded as a limitation of my invention.

Should it be desired to provide for a greater number of adjustments than can conveniently be effected with a single connection structure, a supplementary sleeve and stem unit 7ª—8ª properly equipped may be inserted between the sleeve 7 and stem 8, as shown in Fig. 4, it being understood that a duplicate unit is provided between the other sleeve 7 and the stem 9.

My invention is equally adapted for use with plain braces or with those of the popular "ratchet" type and will be so understood.

I claim:

The combination, in a brace, of a head and a chuck in axial alignment, an operating handle parallel thereto, a laterally projecting stem on said head, a laterally projecting stem on said handle cooperating therewith, a laterally projecting stem on said chuck, and a laterally projecting stem on said handle cooperating therewith, one of each of such cooperating pairs of stems carrying a sleeve adapted to receive the other stem of the pair, each sleeve being provided with a pair of conical apertures and a slot connecting the same, and, on each cooperating stem, a movable fastening member embodying a stem capable of longitudinal movement in the sleeve-slot and a conical head adapted for engagement in either of the conical apertures in said sleeve.

In testimony whereof I have signed my name to this specification.

HARRY G. W. OTT.